US010848920B1

(12) United States Patent
Olafsson et al.

(10) Patent No.: US 10,848,920 B1
(45) Date of Patent: Nov. 24, 2020

(54) GENERATION OF PRECISE GEOSPATIAL COORDINATES

(71) Applicant: Microsoft Technology Licensing, LLC, Redmond, WA (US)

(72) Inventors: Torfi Frans Olafsson, Kirkland, WA (US); Jason Matthew Cahill, Woodinville, WA (US); Jesse Dylan Merriam, Bothell, WA (US); David Richard Reed, Seattle, WA (US); Timothy Arthur Gill, Kenmore, WA (US); Gabriel Takacs, Issaquah, WA (US); Bogdan Cosmin Bucur, Dublin (IE); Andrew Nicholas Bond, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/572,713

(22) Filed: Sep. 17, 2019

(51) Int. Cl.
*H04W 4/029* (2018.01)
*G01S 19/39* (2010.01)
*G06F 16/74* (2019.01)
*H04L 29/08* (2006.01)
(Continued)

(52) U.S. Cl.
CPC ........... *H04W 4/029* (2018.02); *G01S 19/393* (2019.08); *G06F 16/748* (2019.01); *H04L 67/18* (2013.01); *H04W 4/021* (2013.01); *H04W 4/024* (2018.02)

(58) Field of Classification Search
CPC combination set(s) only.
See application file for complete search history.

(56) References Cited

U.S. PATENT DOCUMENTS

| 7,177,737 B2 | 2/2007 | Karlsson et al. |
| 8,174,568 B2 | 5/2012 | Samarasekera et al. |
| 8,599,317 B2 | 12/2013 | Shamur et al. |

(Continued)

FOREIGN PATENT DOCUMENTS

WO    2012138828 A2    10/2012

OTHER PUBLICATIONS

"Understanding World Tracking", Retrieved from: https://developer.apple.com/documentation/arkit/understanding_world_tracking, Retrieved Date: Jul. 10, 2019, 3 Pages.

(Continued)

*Primary Examiner* — Magdi Elhag
(74) *Attorney, Agent, or Firm* — Rainier Patents, P.S.

(57) ABSTRACT

Described herein is a system and method of generating precise location information. Feature points of an image are received from a user device (e.g., mobile phone). Location information of the user device (e.g., GPS coordinates) and relative transform information from the user device are also received. An image anchor is identified based upon the received feature points, relative transform information, and the received location information. Precise location information of the identified image anchor is provided to the user device. The precise location information of the identified image anchor is based upon filtered feature points, location information and relative transform information received from a plurality of user devices over a period of time (e.g., hours, days, weeks, months). The precise location information of the identified image anchor is updated based upon the location information of the user device and the relative transform information received from the user device.

19 Claims, 9 Drawing Sheets

(51) Int. Cl.
*H04W 4/024* (2018.01)
*H04W 4/021* (2018.01)

(56) References Cited

U.S. PATENT DOCUMENTS

| | | | | |
|---|---|---|---|---|
| 8,676,001 | B2* | 3/2014 | Brucher | G06F 16/58 |
| | | | | 382/306 |
| 9,223,013 | B2 | 12/2015 | Stein et al. | |
| 9,424,255 | B2* | 8/2016 | Pengelly | G06F 40/58 |
| 9,761,054 | B2* | 9/2017 | Bronder | G06T 19/006 |
| 10,063,996 | B2* | 8/2018 | Clark | G06F 16/9537 |
| 10,373,381 | B2* | 8/2019 | Nuernberger | G06T 19/006 |
| 10,531,065 | B2* | 1/2020 | Lazarow | H04N 13/344 |
| 2011/0153072 | A1 | 6/2011 | Anderson | |
| 2012/0321222 | A1 | 12/2012 | Smith et al. | |
| 2013/0009954 | A1 | 1/2013 | Ofek et al. | |
| 2013/0238234 | A1* | 9/2013 | Chao | G01C 21/206 |
| | | | | 701/409 |
| 2015/0350846 | A1* | 12/2015 | Chen | G01C 21/206 |
| | | | | 455/456.1 |
| 2015/0356063 | A1* | 12/2015 | Jiang | G06F 40/169 |
| | | | | 715/232 |
| 2016/0147826 | A1* | 5/2016 | Mishra | G01C 21/32 |
| | | | | 707/736 |
| 2017/0358015 | A1* | 12/2017 | Klein | G06Q 30/0282 |
| 2018/0288386 | A1 | 10/2018 | Lazarow et al. | |
| 2018/0329484 | A1 | 11/2018 | Steedly et al. | |
| 2018/0349715 | A1* | 12/2018 | Gupta | G08G 1/0141 |
| 2019/0197709 | A1 | 6/2019 | Windmark et al. | |
| 2019/0317239 | A1* | 10/2019 | Olsson | G01V 3/12 |
| 2019/0370349 | A1* | 12/2019 | Saxena | G06F 16/9537 |

OTHER PUBLICATIONS

Kretzschmar, et al., "Estimating Landmark Locations from Geo-Referenced Photographs", in Proceedings of the IEEE/RSJ International Conference on Intelligent Robots and Systems, Sep. 22, 2008, 6 Pages.

* cited by examiner

GENERATION OF PRECISE GEOSPATIAL COORDINATES

BACKGROUND

Many positioning systems (e.g., Global Positioning System (GPS), Wi-Fi) having known issues with respect to imprecision. For example, weather, surrounding building(s), clock error(s) and the like can cause GPS imprecision of approximately five meters.

SUMMARY

Described herein is a system for generation of precise geospatial coordinates, comprising: a computer comprising a processor and a memory having computer-executable instructions stored thereupon which, when executed by the processor, cause the computer to: receive feature points of an image from a user device; receive location information of the user device and relative transform information from the user device; identify an image anchor of a plurality of image anchors based, at least in part, upon the received feature points, relative transform information, and the received location information, wherein each image anchor comprises a plurality of feature points; provide precise location information of the identified image anchor to the user device, wherein the precise location information of the identified image anchor is based, at least in part, upon filtered feature points, location information and relative transform information received from a plurality of user devices over a period of time; update the precise location information of the identified image anchor based, at least in part, upon the location information of the user device and the relative transform information received from the user device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
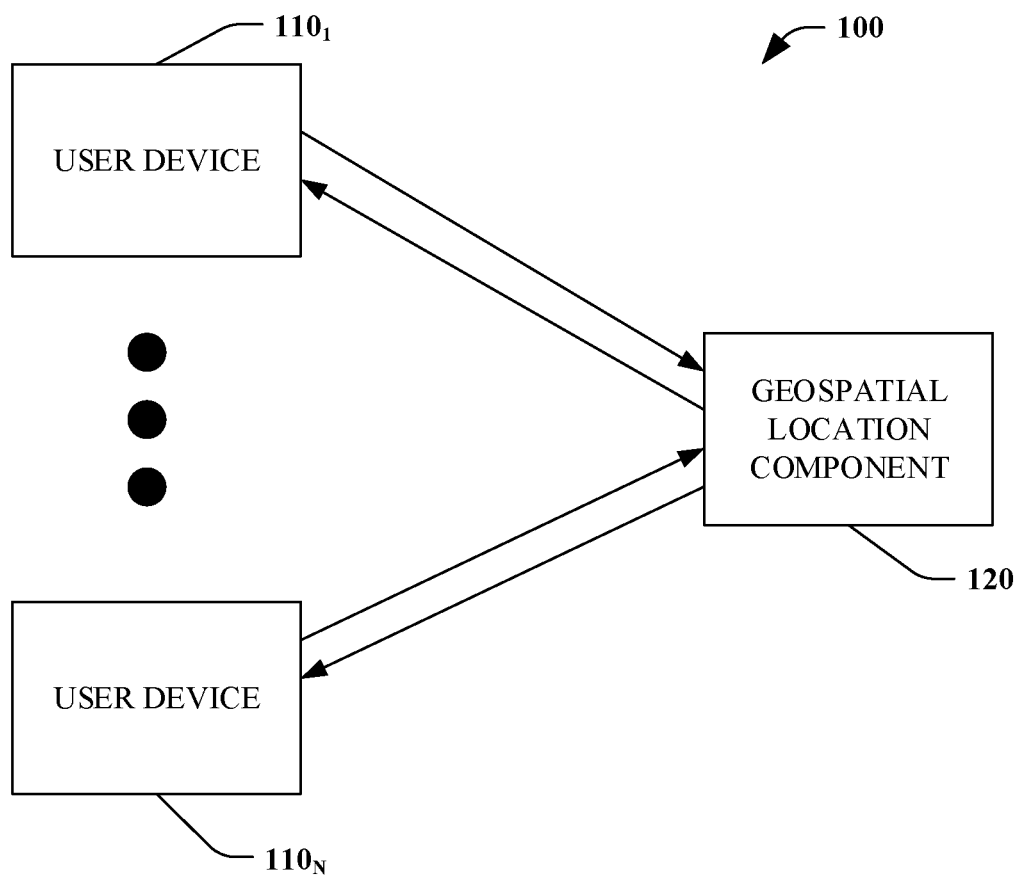
FIG. 1 is a functional block diagram that illustrates a system for generation of precise geospatial coordinates.

Various technologies pertaining to generation of precise geospatial coordinates of a user device by fusing (e.g., combining) positional information (e.g., GPS) and image anchor(s) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding generation of precise geospatial coordinates of a user device by fusing positional information (e.g., GPS) and image anchor(s). What follows are one or more exemplary systems and methods.

Aspects of the subject disclosure pertain to the technical problem of identifying a physical location of a user device within the physical world (e.g., real world). The technical features associated with addressing this problem involve receiving feature points of an image from a user device; receiving location information of the user device and relative transform information from the user device; identifying an image anchor of a plurality of image anchors based, at least in part, upon the received feature points, relative transform information, and the received location information, wherein each image anchor comprises a plurality of feature points; providing precise location information of the identified image anchor to the user device, wherein the precise location information of the identified image anchor is based, at least in part, upon filtered feature points, location information and relative transform information received from a plurality of user devices over a period of time; and updating the precise location information of the identified image anchor based, at least in part, upon the location information of the user device and the relative transform information received from the user device. Accordingly, aspects of these technical features exhibit technical effects of more efficiently, effectively, and precisely locating a user device, for example, reducing computational resource consumption on client device(s) and/or communication bandwidth.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

"User device" refers to a moveable individual computing device including, for example, a mobile phone, a laptop, a tablet, a phablet, a personal digital assistant ("PDA"), an e-reader, a wearable computer (e.g., a watch), a head-mounted display (HMD), an automobile, augmented reality glasses, or any other moveable computing device having components for providing positional information (e.g., GPS) and an image/video (e.g., a camera).

Positioning systems such as GPS have become commonplace in user devices. However, GPS has known issues with respect to imprecision. Weather, surrounding buildings, clock error(s), etc. can cause GPS imprecision of, for example, five meters. Additionally, user devices are frequently utilized indoors. In some scenarios, GPS does not provide adequate information regarding location of user devices indoors (e.g., in a building).

For purposes of explanation and not limitation, the system and method described herein are explained in the context of GPS positioning systems. However, the system and method described herein can utilize other user device-based positioning models such as other Wi-Fi technology (e.g., 802.11az), Bluetooth®, radio frequency identification (RFID), cellular technology (e.g., 3G, 4G, 4G LTE, 5G, etc.) and/or millimeter wave technology to determine geospatial information of a user device.

Described herein is a system and method in which computer vision, feature tracking and visual odometry are utilized to identify feature points of item(s) in the real world and device offsets to those item(s), along with geospatial information (e.g., GPS signals) detected on the user device. This information (e.g., feature points, three-dimensional location information associated with the feature points (e.g., user device's relative transform to the feature points), and/or GPS information of the user device) is provided to a geospatial location component (e.g., cloud-based service) that can collect multiple samples over time (e.g., seconds, minutes, hours, days, months) from a plurality of user devices.

The relative transform refers to a positional offset and rotation information (six degrees of position) of the feature points (image anchor) to the user device 110. "Six degrees of position" (also referred to as "six degrees of freedom") refers to freedom of movement of an object in three-dimensional space along three orthogonal spatial axes (e.g., x, y, and z) and a change in object orientation about three orthogonal rotation axes (e.g., yaw, pitch, and roll).

Using the information received from the user device, the geospatial location component can identify an image anchor of a plurality of stored image anchors. The geospatial location component can provide a stored precise location of the image anchor to the user device.

The geospatial location component can determine the image anchor and/or the precise location of the image anchor by applying a filter (e.g., using linear quadric estimation (Kalman filter)) to samples received from a plurality of user devices over time until the location of the image anchor converges to a precise location. This filtering technique can further be applied to feature points in order to determine an image anchor (e.g., eliminating transient feature point(s)). Once an image anchor location is known to be precise, the exact world location of any user device capturing an image of the image anchor(s) can be calculated using an offset of the user device from the precise location of the image anchor(s) provided by the geospatial location component.

In some embodiments, a user device such as a mobile phone having a camera and GPS can provide information sufficient to generate precise coordinates on Earth without the need for a differential GPS base station and/or other costly device(s) and/sensor(s).

Referring to FIG. 1, a system for generation of precise geospatial coordinates 100 is illustrated. The system 100 includes a plurality of user devices 110 and a geospatial location component 120. In some embodiments, the geospatial location component 120 is a cloud-based service accessible to the plurality of user devices 110 via a computer network (e.g., the Internet). In some embodiments, the geospatial location component 120 is a component of one or more of the plurality of user devices 110.

The user devices 110 can utilize computer vision, feature tracking and visual odometry to identify feature points of item(s) in the real world and a relative transform (e.g., device offsets to those item(s)), along with geospatial information (e.g., GPS signals) detected on the user device. This information (e.g., feature points, relative transform, and/or GPS information of the user device) can be provided to the geospatial location component 120 which can collect multiple samples (e.g., ten, one hundred, one thousand, ten thousand, one hundred thousand, one million) over time (e.g., hours, days, months).

The geospatial location component 120 can apply a filter (e.g., a Kalman filter) to determine an image anchor and a location of the image anchor. As additional samples are provided to the geospatial location component 120 over time, the location of the image anchor converges to a precise location (e.g., removing/reducing noisy/imprecise GPS readings). Once location(s) of image anchor(s) are known to be precise, the exact world location of a particular user device 110 capturing an image of the image anchor(s) can be calculated using an offset of the user device from the location(s) of the image anchor(s).

Figure 2:
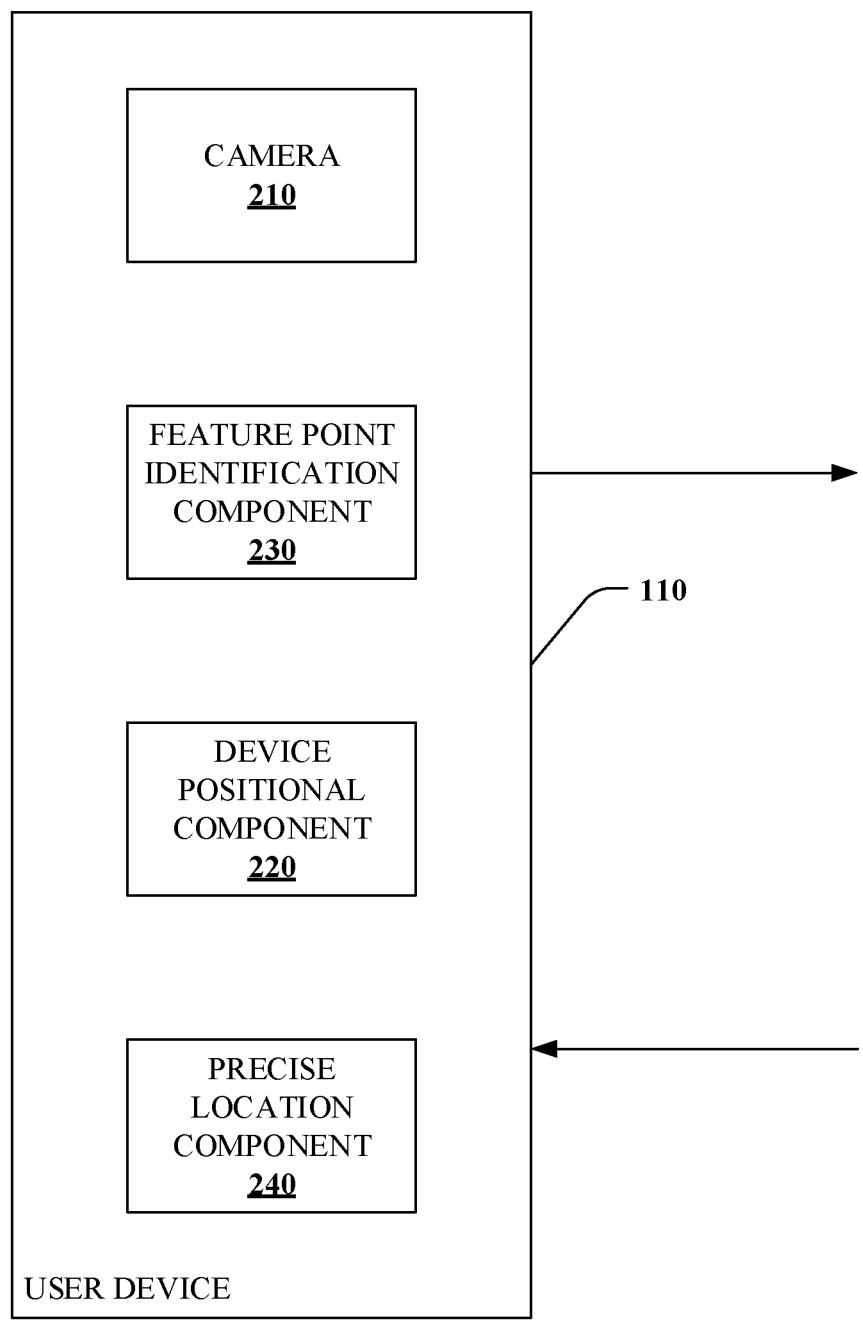
FIG. 2 is a functional block diagram that illustrates a user device.

Turning to FIG. 2 with continued reference to FIG. 1, the user device 110 can include a camera 210 (e.g., rear facing camera of a mobile phone) that captures one or more images of one or more object(s). In some embodiments, the user device 210 includes one camera 210. In some embodiments, the user device 110 includes a plurality of cameras 210 that capture image(s) of object(s).

The user device 110 further includes device positional component 220 that identifies and/or determines positional information of the user device 110. For example, the device positional component 220 can determine a coarse (e.g., imprecise) geospatial location (e.g., three-dimensional) of the user device 110 when image(s) of the object(s) were captured. In some embodiments, the device positional component 220 includes a GPS system, a Wi-Fi location system, a compass, and/or an accelerometer. In some embodiments, the positional information comprises a GPS location, orientation to a ground plane, and a compass heading of the user device 110 at the moment the user device 110 captures the image(s).

The user device 110 further includes a feature point identification component 230 that uses computer vision technique(s) to identify feature points of the captured image(s) (e.g., a point cloud). The feature point identification component 230 further calculates three-dimensional location information (e.g., relative transform (T) of the user device 110 to the feature points) for each of the feature points based, at least in part, upon the determined positional information of the user device 110 (e.g., coarse geospatial location of the user device 110).

The user device 110 can provide the determined positional information (G), the identified feature points, and the three-dimensional location information for each of the feature points (e.g., relative transform (T) of the user device 110 to the feature points) to the geospatial location component 120. If there was no error or imprecision in the device positional component 220 (e.g., GPS sensor, accelerometers, and/or compass), the transform G+T would provide information regarding an exact location of the feature points (e.g., the image anchor) on Earth with millimeter precision. However, a single reading can have imprecisions, as discussed previously. Using the information received from the user device, the geospatial location component 120 can identify an image anchor associated with at least some of the feature points and provide a precise location of the image anchor to the user device 110, as discussed in greater detail below.

A precise location component 240 of the user device 110 can receive the precise location information of an image anchor associated with at least some of the feature points from the geospatial location component 120. The precise location component 240 can calculate a precise location of the user device 110 based, at least in part, upon the received precise location information of the image anchor. Once location(s) of image anchor(s) are known to be precise, the exact world location of a particular user device 110 capturing an image of the image anchor(s) can be calculated subtracting an offset of the user device (e.g., relative transform) from the precise location(s) of the image anchor(s). Thus, the system 100 can calculate the six-degree location and orientation of the user device 110 relative to the image anchor.

Figure 3:
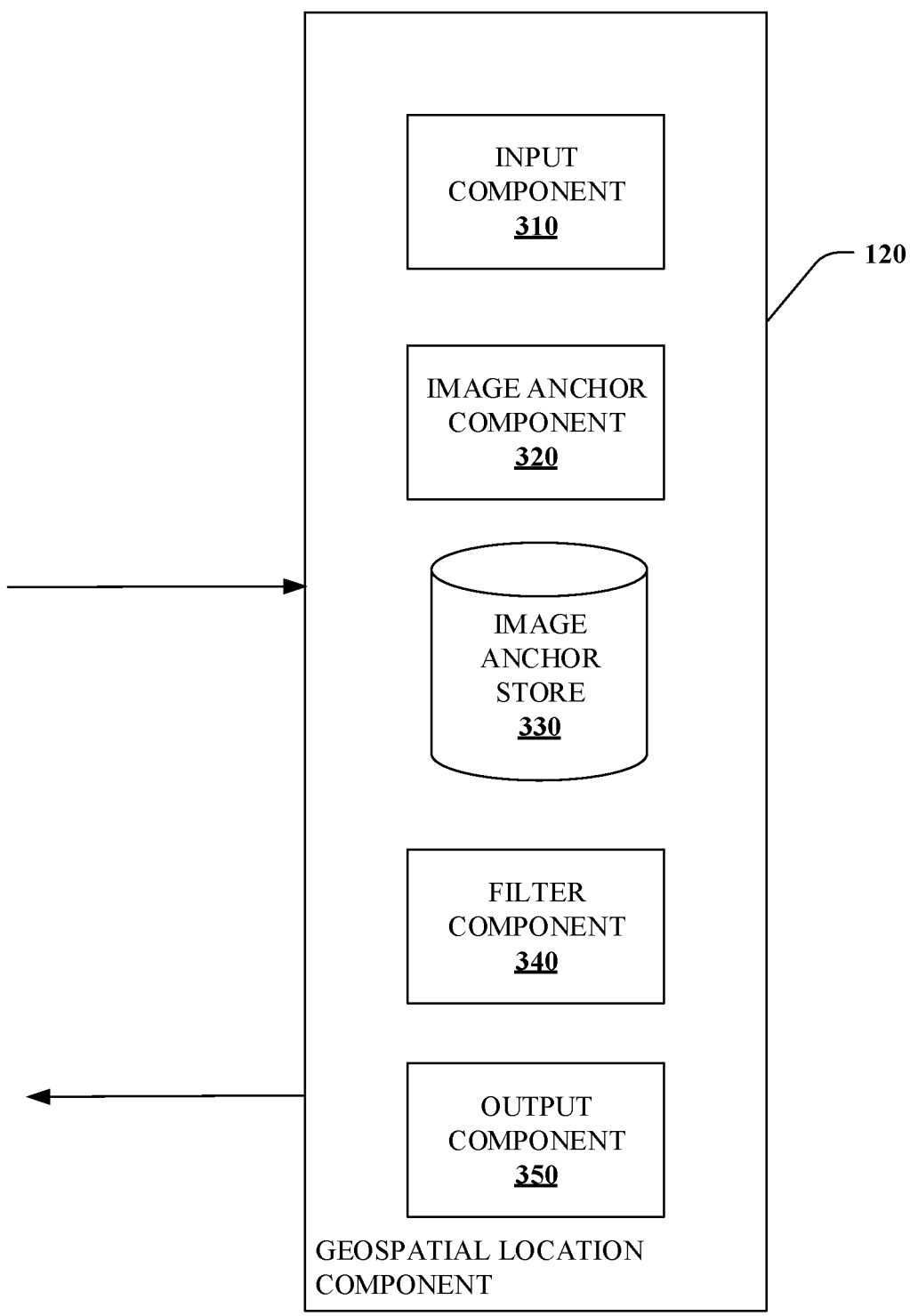
FIG. 3 is a functional block diagram that illustrates a geospatial location component.

Referring to FIG. 3, with continued reference to FIG. 1, the geospatial location component 120 can include an input component 310 that receives determined positional information, feature points, and three-dimensional location information for each of the feature points, from a user device 110.

An image anchor component 320 can group a cluster of known feature points into an image anchor. The image anchor can be retrieved at a later time and compared to feature points captured by the same and/or different user device(s) 110. The image anchor component 320 can store information regarding the image anchor including feature points, three-dimensional location information for each of the feature points, and/or a location of the image anchor in an image anchor store 330.

This information (e.g., the feature points, three-dimensional location information for each of the feature points, and/or the location of the image anchor) can be refined by a filter component 340 over a period of time (e.g., minutes, hours, days, months, years) based upon information received from a plurality of user devices 110. In some embodiments, the filter component 340 can utilize a Kalman filter to determine the image anchor location (e.g., the feature points, three-dimensional location information for each of the feature points, and/or the location of the image anchor). In this manner, positional imprecision and/or transient feature points can be filtered out, with the stored image anchor information (e.g., feature points, three-dimensional location information for each of the feature points, and/or the location of the image anchor) converging with greater and greater precision over time. Thus, as additional samples are provided to the geospatial location component 120 over time, the location of the image anchors converge to precise location(s).

In some embodiments, a set of image anchors detected in proximity to each other in a same session can be joined to form a graph of known anchors and their relative location and orientation (e.g., together known as transform) to each other. Recalling a particular image anchor of a graph allows for determination of the relative location of any of the other image anchors on the graph by traversing the graph and adding the transforms that separate the image anchors.

In response to receipt of determined positional information, feature points, and three-dimensional location information for each of the feature points, from a particular user devices 110 at a particular time, an image anchor identification component 340 can identify particular image anchor(s) of a plurality of image anchors stored in the image anchor store 330. The image anchor identification component 340 can identify the particular image anchor(s) based, at least in part, upon the received determined positional information (e.g., GPS coordinates), feature points, and three-dimensional location information for each of the feature points.

An output component 350 can provide precise location information of the identified image anchor to the user device to the user device 110. The precise location information of the identified image anchor can be retrieved from the image anchor store 330.

Figure 4:
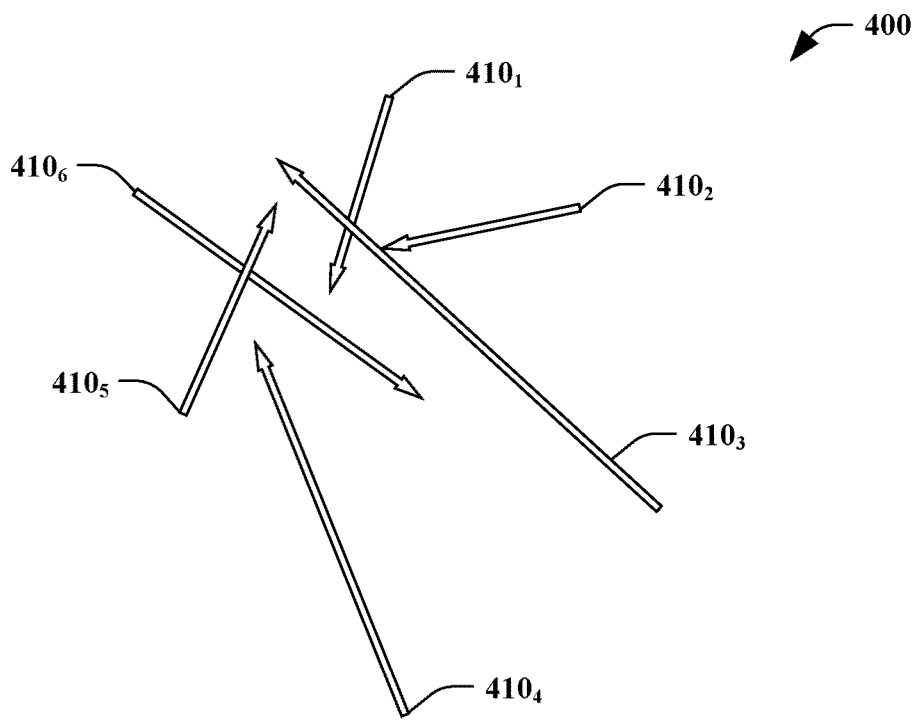
FIG. 4 is a diagram that illustrates exemplary feature point location information from received six user devices.

Turning to FIG. 4, a diagram 400 illustrates exemplary feature point location information received from six user devices. The base of each arrow 410 represents the location the particular user device, and the point of each arrow the location of the feature points (e.g., image anchor) based upon information received from the user devices. The diagram 400 thus illustrates non-convergence of the information received from the user devices (e.g., a set of noisy readings).

Figure 5:
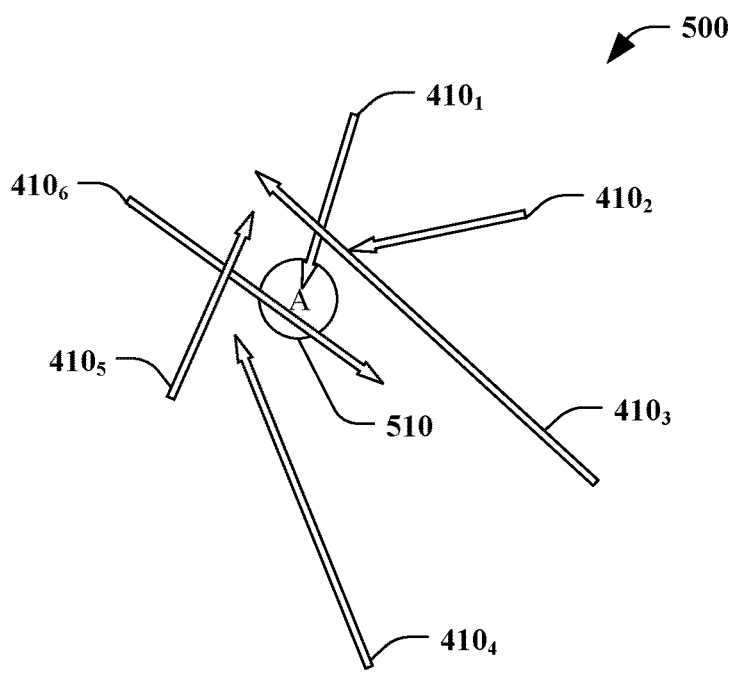
FIG. 5 is a diagram that illustrates exemplary convergence of an image anchor.

Referring next to FIG. 5, a diagram 500 illustrates exemplary convergence of an image anchor based upon feature point location received from six user devices. In this example, a filter (e.g., Kalman filter) has been applied to the location information received from the user devices to determine an image anchor 520 having a precise location from a set of inaccurate readings as discussed with respect to FIG. 4. Thus, by applying a Kalman filter to the set of noisy readings as illustrated in FIG. 4, the geospatial location component 220 can over time converge on a more and more precise estimate of where the image anchor is in the world.

Six user devices are used to illustrate the principles underlying the use of a Kalman filter. The geospatial location component 120 can collect multiple samples from a plurality of user devices (e.g., ten, one hundred, one thousand, ten thousand, one hundred thousand, one million) over a period of time (e.g., hours, days, months).

Figure 6:
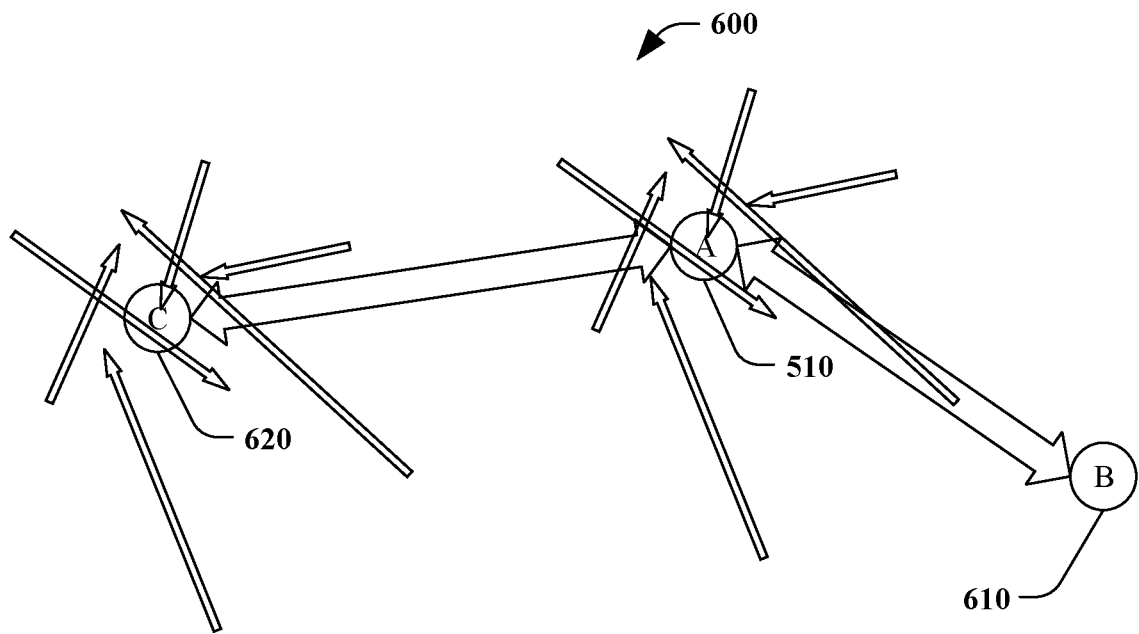
FIG. 6 is a diagram that illustrates an exemplary image anchor graph.

Referring to FIG. 6 with continued reference to FIG. 1, a diagram 600 illustrates an exemplary image anchor graph. As discussed above, in some embodiments, image anchors 510, 610, 620 can be joined to form a graph. Knowing the relative transforms between image anchors 510, 610, 620 (nodes) of the graph, the precise location of the image anchors in the graph can be calculated from another of the image anchors in the graph.

Thus, using the geospatial location component 120 and establishing a progressively more accurate location of the image anchors in the graph, the image the anchors can be used as a hyper precise GPS beacon. When a user device 110 recognizes an image anchor, the geospatial location component 120 can fetch the image anchor's persisted best estimate location L. The geospatial location component 120 and/or the user device 110 can then subtract the transform offset (O) between location of the image anchor (L) and the device, O from L to arrive at a best estimated location of the user device 110.

There can be a risk of oversaturation of data, or old, bad data. In some embodiments, the geospatial location component 120 system can phase out image anchors that are determined old (e.g., stale), and/or that have never been recovered while other anchors have been recovered.

In some embodiments, the system 100 can provide a precise location information for a plurality of image anchors (e.g., of an image anchor graph) as the user device 110 is moving along a trajectory (e.g., through a park, along a road). Periodically (e.g., each fraction of a second, each second, etc.) and/or asynchronously (e.g., upon request of a user), the user device 110 can capture images, identify features points in the captured images, and provide the identified feature points, relative transform information (T), and location information of the user device (G) to the geospatial location component 120.

The geospatial location component 120 can provide precise location information of identified image anchor(s) to the user device 110 from which a precise location of the user device 110 can be calculated. Thus, the system 100 can facilitate the user device 110 continually calculating the precise location of the user device 110 as the user device 110 physically moves along the trajectory.

Figure 7:
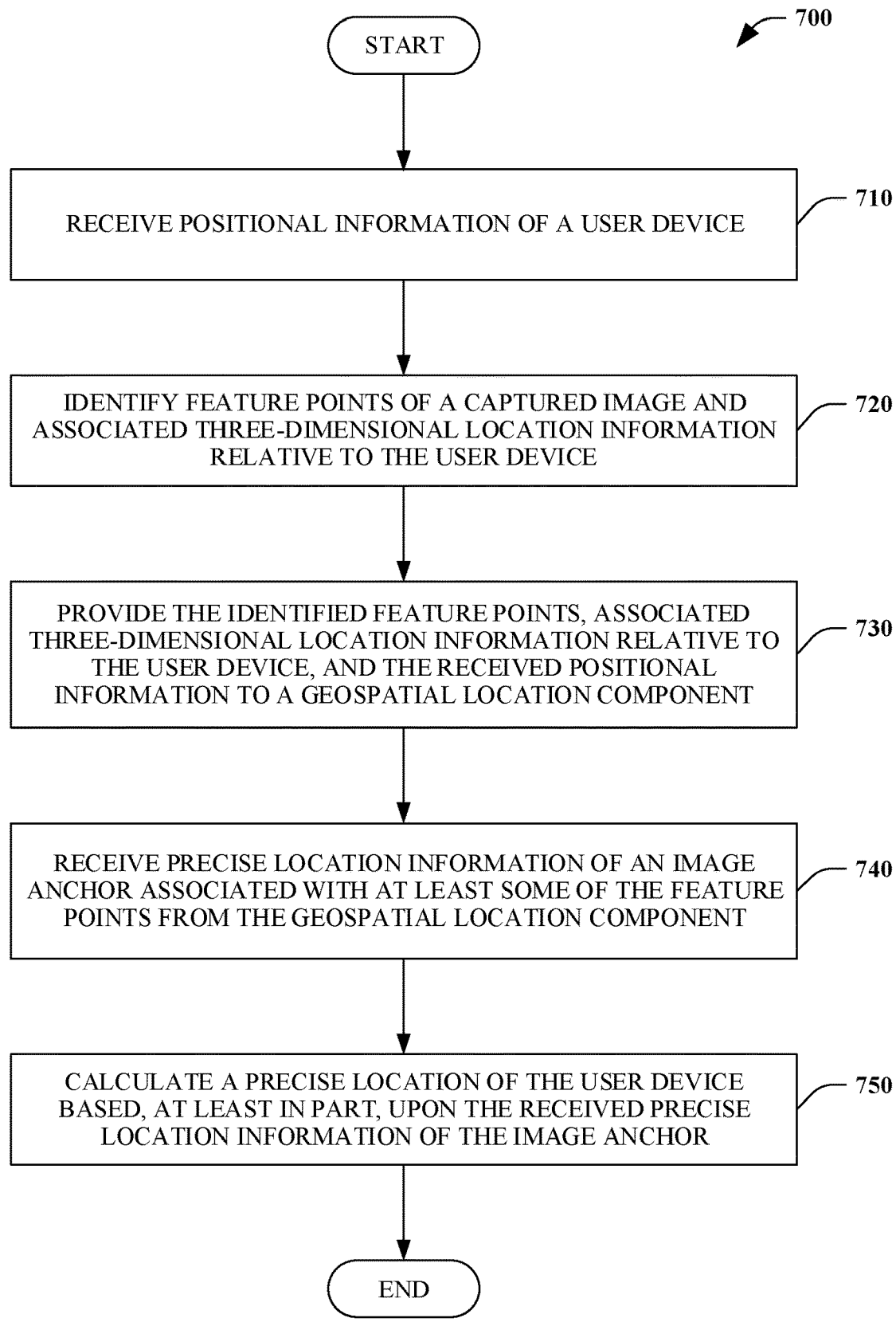
FIG. 7 is a flow chart that illustrates a method of obtaining precise location by a user device.
Figure 8:
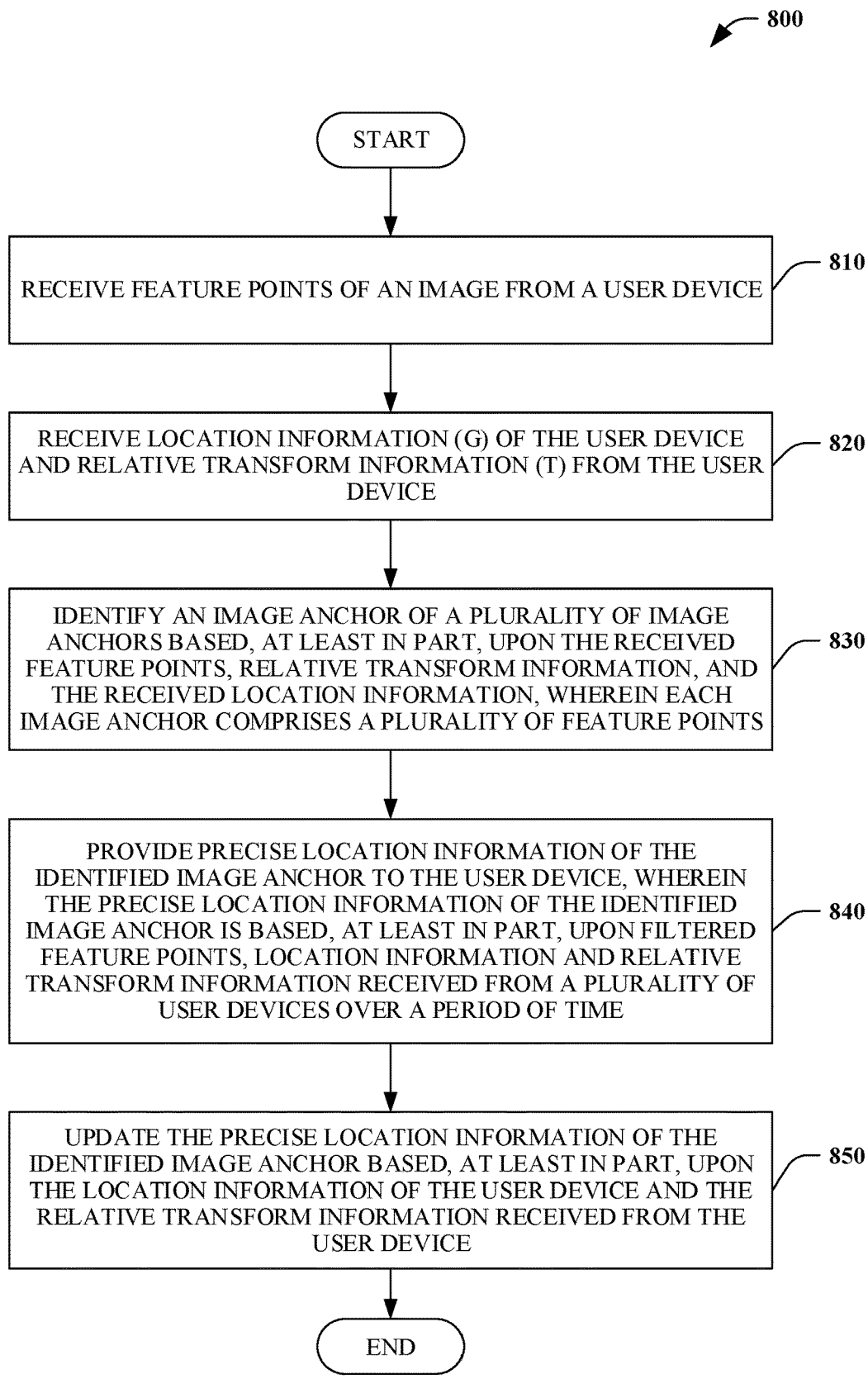
FIG. 8 is a flow chart that illustrates a method of generating precise location information of an image anchor.
Figure 9:
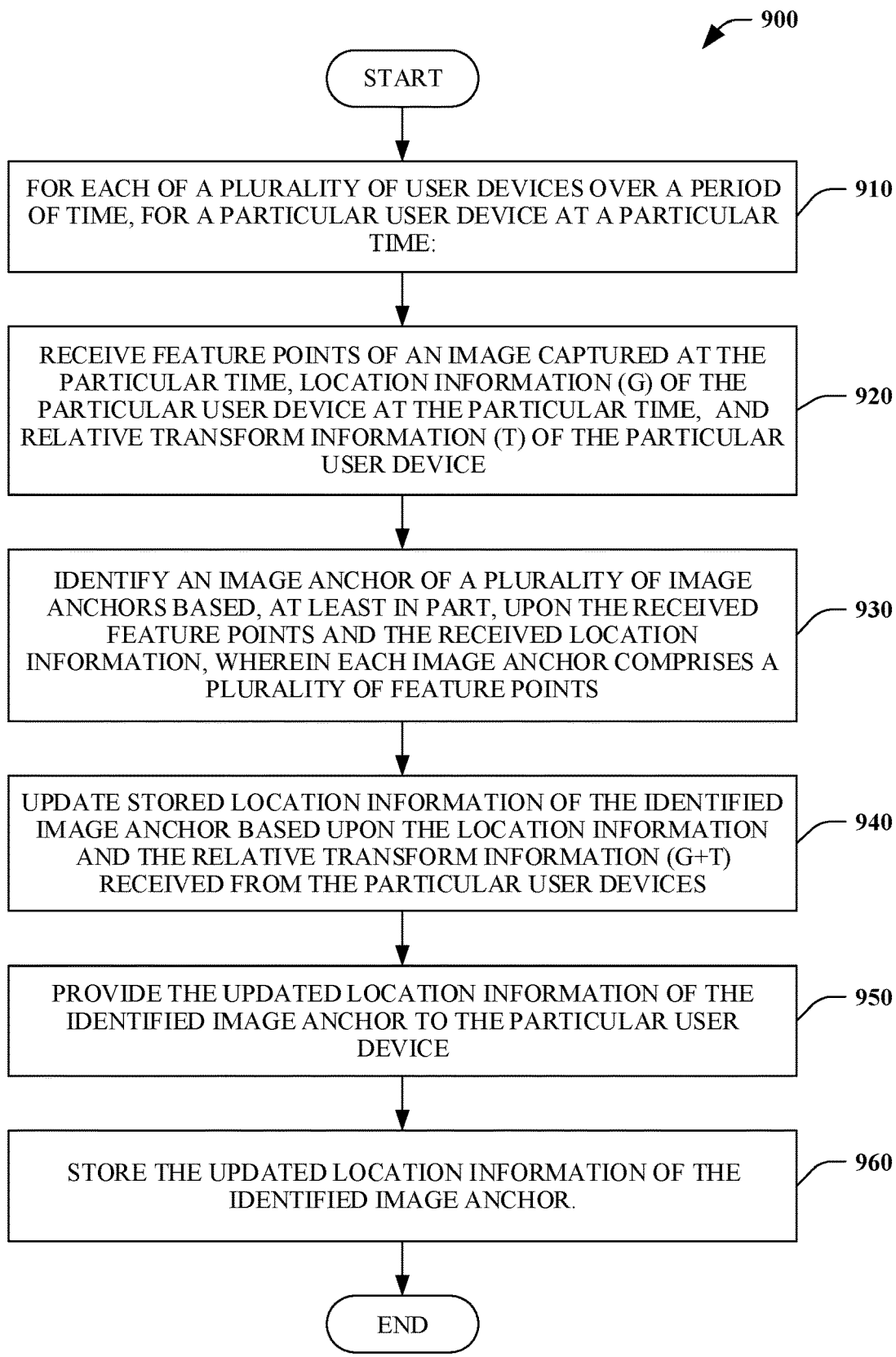
FIG. 9 is a flow chart that illustrates a method of generating precise location information of an image anchor.

FIGS. 7-9 illustrate exemplary methodologies relating to generation of precise geospatial coordinates. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 7, a method of obtaining precise location by a user device 700 is illustrated. In some embodiments, the method 700 is performed by the user device 110.

At 710, positional information of a user device is received. At 720, feature points of a captured image and associated three-dimensional location information relative to the user device are identified. At 730, the identified feature points, associated three-dimensional location information relative to the user device, and the received positional information is provided to a geospatial location component.

At 740, precise location information of an image anchor associated with at least some of the feature points is received from the geospatial location component. At 750, a precise location of the user device is calculated based, at least in part, upon the received precise location information of the image anchor. For example, a transform offset (0) of the user device can be subtracted from the precise location of the image anchor (L) to arrive at a best estimated location of the user device.

Turning to FIG. 8, a method of generating precise location information of an image anchor is illustrated. In some embodiments, the method 800 is performed by the geospatial location component 120.

At 810, feature points of an image are received from a user device. At 820, location information (G) of the user device and relative transform information (T) is received from the user device.

At 830, an image anchor of a plurality of image anchors is identified based, at least in part, upon the received feature points, relative transform information, and the received location information. Each image anchor comprises a plurality of feature points.

At 840, precise location information of the identified image anchor is provided to the user device. The precise location information of the identified image anchor is based, at least in part, upon filtered feature points, location information and relative transform information received from a plurality of user devices over a period of time. At 850, the precise location information of the identified image anchor is updated based, at least in part, upon the location information of the user device and the relative transform information received from the user device.

Next, referring to FIG. 9, a method of generating precise location information of an image anchor is illustrated. In some embodiments, the method 800 is performed by the geospatial location component 120.

At 910, for each of a plurality of user devices over a period of time, for a particular user device at a particular time, at 920, feature points of an image captured at the particular time, location information (G) of the particular user device at the particular time, and relative transform information (T) of the particular user device are received. At 930, an image anchor of a plurality of image anchors is identified based, at least in part, upon the received feature points and the received location information. Each image anchor comprises a plurality of feature points.

At 940, stored location information of the identified image anchor is updated based upon the location information and the relative transform information (G+T) received from the particular user devices. At 950, the updated location information of the identified image anchor is provided to the particular user device. At 960, the updated location information of the identified image anchor is stored.

Described herein is a system for generation of precise geospatial coordinates, comprising: a computer comprising a processor and a memory having computer-executable instructions stored thereupon which, when executed by the processor, cause the computer to: receive feature points of an image from a user device; receive location information of the user device and relative transform information from the user device; identify an image anchor of a plurality of image anchors based, at least in part, upon the received feature points, relative transform information, and the received location information, wherein each image anchor comprises a plurality of feature points; provide precise location information of the identified image anchor to the user device, wherein the precise location information of the identified image anchor is based, at least in part, upon filtered feature points, location information and relative transform information received from a plurality of user devices over a period of time; and update the precise location information of the identified image anchor based, at least in part, upon the location information of the user device and the relative transform information received from the user device.

The system can further include wherein the feature points, location information and relative transform information received from the plurality of user devices over the period of time are filtered using a Kalman filter. The system can further include wherein the received location information of the user device comprises global positioning system (GPS) coordinates. The system can further include wherein the period of time is greater than twenty-four hours. The system can further include wherein the period of time is greater than one week.

The system can further include wherein the system is a cloud-based service accessible to the user device via the Internet. The system can further include wherein the relative transform information comprises a positional offset and rotation information of the feature points to the user device.

Described herein is a method of generating precise location information of an image anchor, comprising: receiving feature points of an image from a user device; receiving location information of the user device and relative transform information from the user device; identifying an image anchor of a plurality of image anchors based, at least in part, upon the received feature points, relative transform information, and the received location information, wherein each image anchor comprises a plurality of feature points; providing precise location information of the identified image anchor to the user device, wherein the precise location information of the identified image anchor is based, at least in part, upon filtered feature points, location information and relative transform information received from a plurality of user devices over a period of time; and updating the precise location information of the identified image anchor based, at least in part, upon the location information of the user device and the relative transform information received from the user device.

The method can further include wherein the feature points, location information and relative transform information received from the plurality of user devices over the period of time are filtered using a Kalman filter. The method can further include wherein the received location information of the user device comprises global positioning system (GPS) coordinates.

The method can further include wherein the period of time is greater than twenty-four hours. The method can further include wherein the period of time is greater than one week. The method can further include wherein the system is a cloud-based service accessible to the user device via the Internet. The method can further include wherein the relative transform information comprises a positional offset and rotation information of the feature points to the user device.

Described herein is a computer storage media storing computer-readable instructions that when executed cause a computing device to: receive feature points of an image from a user device; receive location information of the user device and relative transform information from the user device; identify an image anchor of a plurality of image anchors based, at least in part, upon the received feature points, relative transform information, and the received location information, wherein each image anchor comprises a plurality of feature points; provide precise location information of the identified image anchor to the user device, wherein the precise location information of the identified image anchor is based, at least in part, upon filtered feature points, location information and relative transform information received from a plurality of user devices over a period of time; and update the precise location information of the identified image anchor based, at least in part, upon the location information of the user device and the relative transform information received from the user device.

The computer storage media can further include wherein the feature points, location information and relative transform information received from the plurality of user devices over the period of time are filtered using a Kalman filter. The computer storage media can further include wherein the received location information of the user device comprises global positioning system (GPS) coordinates.

The computer storage media can further include wherein the period of time is greater than twenty-four hours. The computer storage media can further include wherein the system is a cloud-based service accessible to the user device via the Internet. The computer storage media can further include wherein the relative transform information comprises a positional offset and rotation information of the feature points to the user device.

Figure 10:
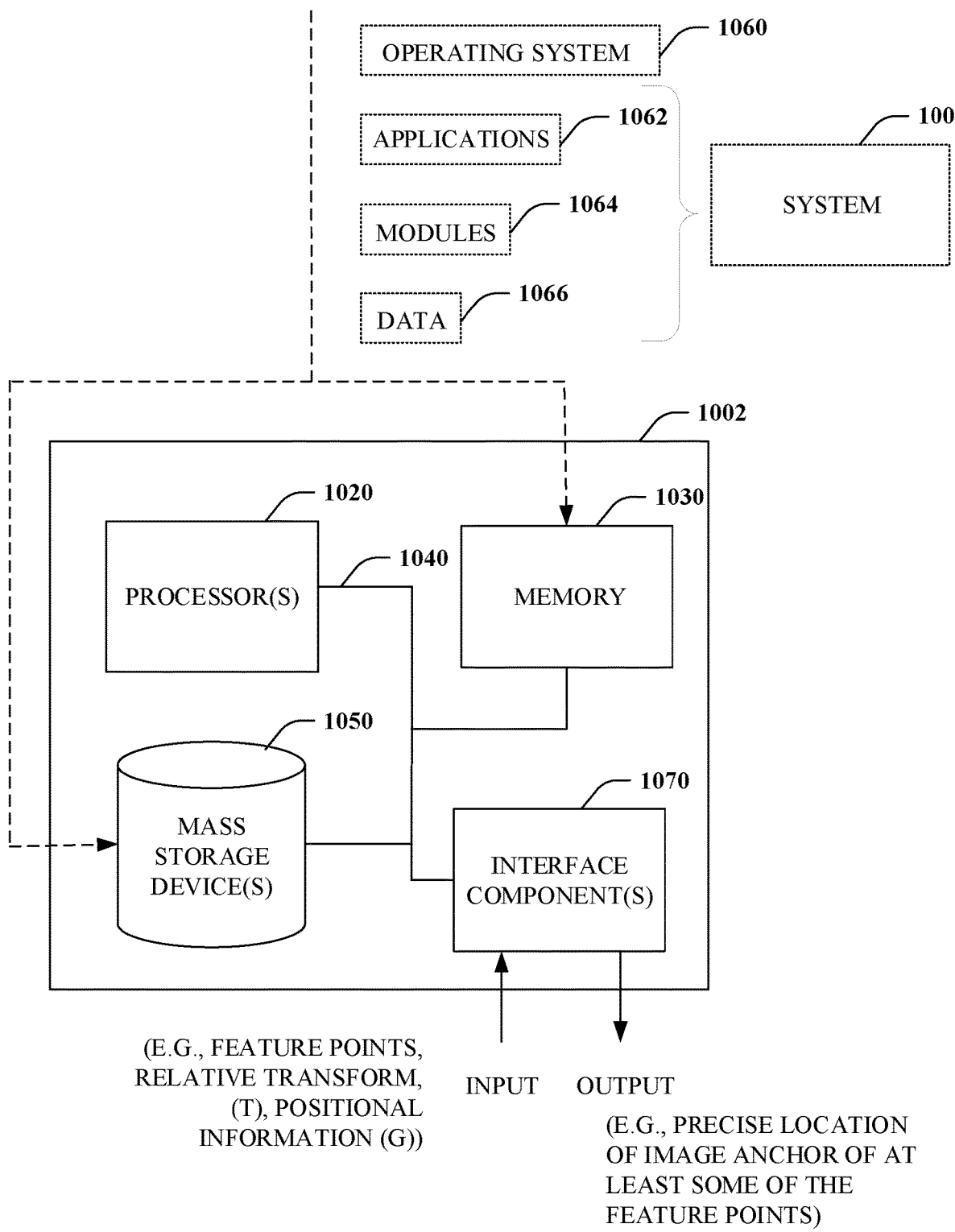
FIG. 10 is a functional block diagram that illustrates an exemplary computing system.

With reference to FIG. 10, illustrated is an example general-purpose computer or computing device 1002 (e.g., mobile phone, desktop, laptop, tablet, watch, server, handheld, programmable consumer or industrial electronics, set-top box, game system, compute node, etc.). For instance, the computing device 1002 may be used in a system for estimating material(s) for fabrication of a three-dimensional object 100.

The computer 1002 includes one or more processor(s) 1020, memory 1030, system bus 1040, mass storage device(s) 1050, and one or more interface components 1070. The system bus 1040 communicatively couples at least the above system constituents. However, it is to be appreciated that in its simplest form the computer 1002 can include one or more processors 1020 coupled to memory 1030 that execute various computer executable actions, instructions, and or components stored in memory 1030. The instructions may be, for instance, instructions for implementing functionality described as being carried out by one or more components discussed above or instructions for implementing one or more of the methods described above.

The processor(s) 1020 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1020 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1020 can be a graphics processor.

The computer 1002 can include or otherwise interact with a variety of computer-readable media to facilitate control of the computer 1002 to implement one or more aspects of the claimed subject matter. The computer-readable media can be any available media that can be accessed by the computer 1002 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 1002. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1030 and mass storage device(s) 1050 are examples of computer-readable storage media. Depending on the exact configuration and type of computing device, memory 1030 may be volatile (e.g., RAM), non-volatile (e.g., ROM, flash memory, etc.) or some combination of the two. By way of example, the basic input/output system (BIOS), including basic routines to transfer information between elements within the computer 1002, such as during start-up, can be stored in nonvolatile memory, while volatile memory can act as external cache memory to facilitate processing by the processor(s) 1020, among other things.

Mass storage device(s) 1050 includes removable/non-removable, volatile/non-volatile computer storage media for storage of large amounts of data relative to the memory 1030. For example, mass storage device(s) 1050 includes, but is not limited to, one or more devices such as a magnetic or optical disk drive, floppy disk drive, flash memory, solid-state drive, or memory stick.

Memory 1030 and mass storage device(s) 1050 can include, or have stored therein, operating system 1060, one or more applications 1062, one or more program modules 1064, and data 1066. The operating system 1060 acts to control and allocate resources of the computer 1002. Applications 1062 include one or both of system and application software and can exploit management of resources by the operating system 1060 through program modules 1064 and data 1066 stored in memory 1030 and/or mass storage device (s) 1050 to perform one or more actions. Accordingly, applications 1062 can turn a general-purpose computer 1002 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 1062, and include one or more modules 1064 and data 1066 stored in memory and/or mass storage device (s) 1050 whose functionality can be realized when executed by one or more processor(s) 1020.

In some embodiments, the processor(s) 1020 can correspond to a system on a chip (SOC) or like architecture including, or in other words integrating, both hardware and software on a single integrated circuit substrate. Here, the processor(s) 1020 can include one or more processors as well as memory at least similar to processor(s) 1020 and memory 1030, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 1002 also includes one or more interface components 1070 that are communicatively coupled to the system bus 1040 and facilitate interaction with the computer 1002. By way of example, the interface component 1070 can be a port (e.g., serial, parallel, PCMCIA, USB, FireWire, etc.) or an interface card (e.g., sound, video, etc.) or the like. In one example implementation, the interface component 1070 can be embodied as a user input/output interface to enable a user to enter commands and information into the computer 1002, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 1070 can be embodied as an output peripheral interface to supply output to displays (e.g., LCD, LED, plasma, etc.), speakers, printers, and/or other computers, among other things. Still further yet, the interface component 1070 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system for generation of precise geospatial coordinates, comprising:
   a computer comprising a processor and a memory having computer-executable instructions stored thereupon which, when executed by the processor, cause the computer to:
   receive feature points of an image from a user device;
   receive location information of the user device and relative transform information from the user device;
   identify a first image anchor from among a plurality of additional image anchors based, at least in part, upon the received feature points, the relative transform information, and the received location information, wherein each image anchor comprises a plurality of feature points, and the first image anchor and the plurality of additional image anchors are joined in a graph;

receive secondary location information regarding the identified first image anchor from a plurality of secondary user devices;

filter the received location information and the secondary location information to determine precise location information of the identified first image anchor;

provide the precise location information of the identified first image anchor to the user device;

update stored location information of the identified first image anchor according to the precise location information; and calculate precise location information for the plurality of additional image anchors in the graph based at least in part on the precise location information of the identified first image anchor.

2. The system of claim 1, wherein the secondary location information is filtered using a Kalman filter.

3. The system of claim 1, wherein the received location information of the user device comprises global positioning system (GPS) coordinates.

4. The system of claim 1, wherein the secondary location information is received over a period of time that is greater than twenty-four hours.

5. The system of claim 1, wherein the secondary location information is received over a period of time that is greater than one week.

6. The system of claim 1, wherein the system is a cloud-based service accessible to the user device via an Internet connection.

7. The system of claim 1, wherein the relative transform information comprises a positional offset and rotation information of the feature points to the user device.

8. A method of generating precise location information of an image anchor, comprising:

receiving feature points of an image from a user device;

receiving location information of the user device and relative transform information from the user device;

identifying a first image anchor from among a plurality of additional image anchors based, at least in part, upon the received feature points, the relative transform information, and the received location information, wherein each image anchor comprises a plurality of feature points;

receiving secondary location information regarding the identified first image anchor from a plurality of secondary user devices;

filtering the received location information and the secondary location information to determine precise location information of the identified first image anchor;

providing the precise location information of the identified first image anchor to the user device;

updating stored location information of the identified first image anchor according to the precise location information; and calculating precise location information for the plurality of additional image anchors based at least in part on the precise location information of the identified first image anchor.

9. The method of claim 8, wherein the secondary location information is filtered using a Kalman filter.

10. The method of claim 8, wherein the received location information of the user device comprises global positioning system (GPS) coordinates.

11. The method of claim 8, wherein the secondary location information is received over a period of time that is greater than twenty-four hours.

12. The method of claim 8, wherein the secondary location information is received over a period of time that is greater than one week.

13. The method of claim 8, wherein the relative transform information comprises a positional offset and rotation information of the feature points to the user device.

14. A computer storage media storing computer-readable instructions that when executed cause a computing device to:

receive feature points of an image from a user device;

receive location information of the user device and relative transform information from the user device;

identify a first image anchor of a plurality of additional image anchors based, at least in part, upon the received feature points, the relative transform information, and the received location information, wherein each image anchor comprises a plurality of feature points;

receive secondary location information regarding the identified first image anchor from a plurality of secondary user devices;

filter the received location information and the secondary location information to determine precise location information of the identified first image anchor;

provide the precise location information of the identified first image anchor to the user device;

update stored location information of the identified first image anchor according to the precise location information; and calculate precise location information for the plurality of additional image anchors based at least in part on the precise location information of the identified first image anchor.

15. The computer storage media of claim 14, wherein the secondary location information is filtered using a Kalman filter.

16. The computer storage media of claim 14, wherein the received location information of the user device comprises global positioning system (GPS) coordinates.

17. The computer storage media of claim 14, wherein the secondary location information is received over a period of time that is greater than twenty-four hours.

18. The computer storage media of claim 14, wherein the computer-readable instructions provide a cloud-based service accessible to the user device via an Internet connection.

19. The computer storage media of claim 14, wherein the relative transform information comprises a positional offset and rotation information of the feature points to the user device.

* * * * *